W. O. CORNWELL, Jr.
SEAT ARRANGEMENT FOR AUTOMOBILES.
APPLICATION FILED DEC. 9, 1913.
1,146,849.
Patented July 20, 1915.
2 SHEETS—SHEET 2.
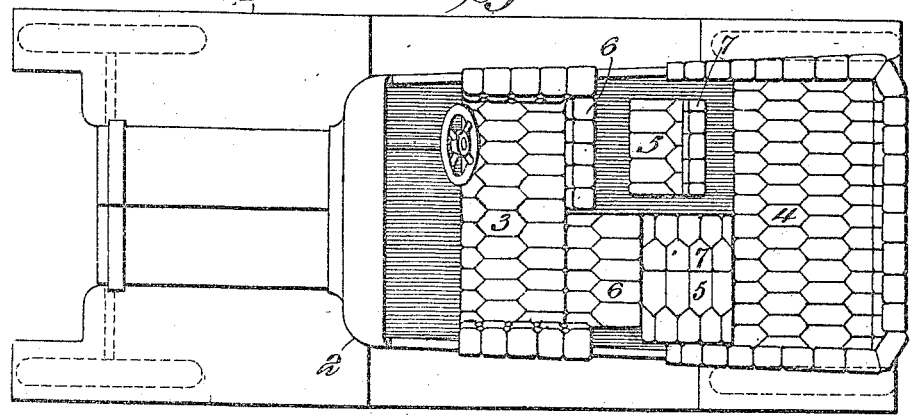
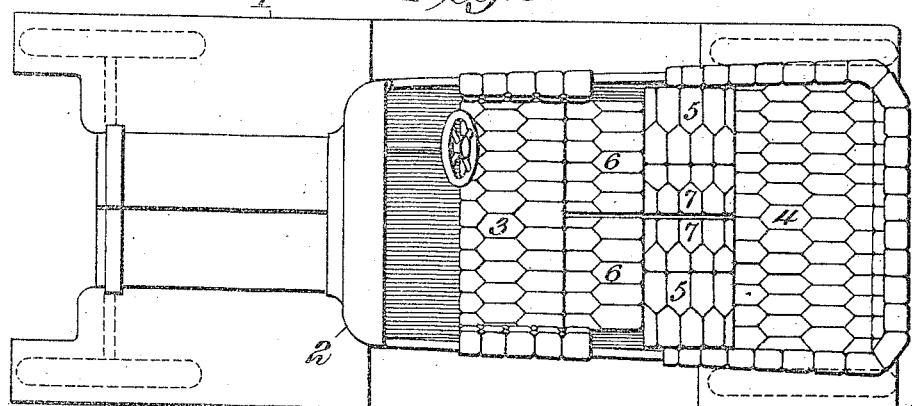
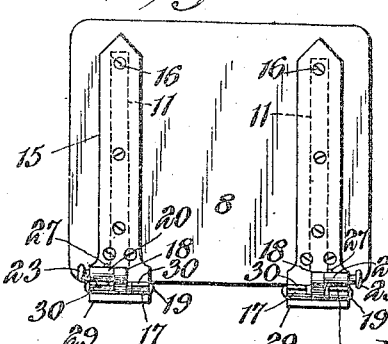
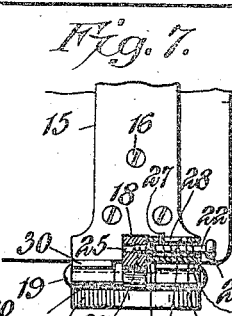
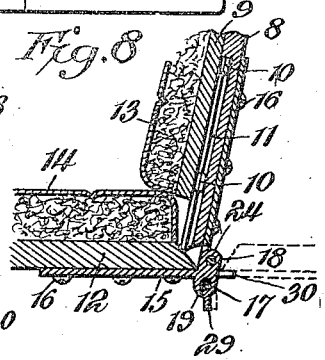
WITNESSES
Howard D. Orr.
F. T. Chapman.
William O. Cornwell, Jr. INVENTOR,
BY
ATTORNEYS tion # UNITED STATES PATENT OFFICE.

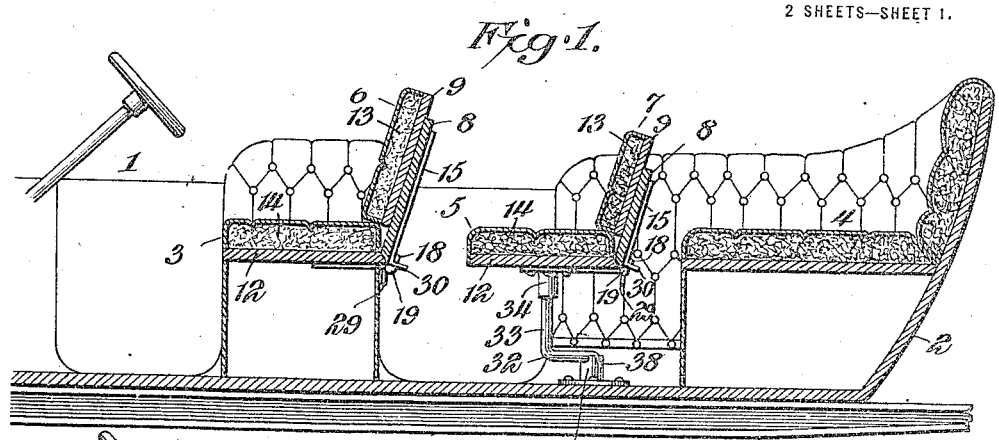

WILLIAM O. CORNWELL, JR., OF TEXLINE, TEXAS.

SEAT ARRANGEMENT FOR AUTOMOBILES.

1,146,849.

Specification of Letters Patent.

Patented July 20, 1915.

Application filed December 9, 1913. Serial No. 805,579.

*To all whom it may concern:*

Be it known that I, WILLIAM O. CORNWELL, Jr., a citizen of the United States, residing at Texline, in the county of Dallam and State of Texas, have invented certain new and useful Improvements in Seat Arrangement for Automobiles, of which the following is a specification.

This invention has reference to improvements in seat arrangements for automobiles, and is designed to provide seats for automobiles so constructed and disposed that they may be used in the ordinary manner and may be quickly converted into an elongated support after the manner of a bed or cot, either for sleeping purposes or for ambulance purposes.

While the present invention is particularly adapted for use in connection with automobiles, it is by no means limited to such use, but may be applied in some or all of its features to other types of vehicles. To simplify description, however, the use of the invention will be described in connection with an automobile, with the understanding that by so limiting the description the adaptability of the invention is not thereby limited, and the term automobile is to be interpreted as broad enough to cover any vehicle to which the present invention may be applied.

Touring car bodies of automobiles are customarily provided with a wide rear seat and another wide seat for the operator of the vehicle and for a passenger, and in the larger types of touring bodies auxiliary seats are arranged between the front and rear seats, which auxiliary seats are so made as to be readily folded up out of the way when not in use.

By the present invention the back portion of the front seat is made into two parts separated at the middle and each part may be turned down flat on a level with the seat portion of the front seat and on a level with the seat portion of the rear seat, and in the smaller touring car bodies this back may be made long enough to reach to the forward edge of the rear seat. However, in the larger touring car bodies provided with auxiliary seats the backs of the latter are so constructed as to permit turning them down until on a level with the seat portions of the other seats, whereupon the auxiliary seats with the backs turned down flat can be adjusted to bridge the space between the rear edge of the turned-down back portion of the front seat and the front portion of the rear seat, thus providing a level support like a continuous mattress, but which may be much softer, extending lengthwise of the vehicle and sufficiently long to support the human body in a recumbent position. By dividing the back portion of the front seat midway of its length either portion may be let down, so that a couch or support half the width of the vehicle may be provided or the couch or support may be made as wide as the seating portion of the vehicle body, as may be desired. With such construction a touring car, and particularly one of the six or seven passenger type, may be very readily made comfortable for the occupants when forced to stay in the vehicle all night. Again, the vehicle body may be quickly adjusted to accommodate a sick or injured person with a physician and attendant seated beside the couch-like support, for in such instance but one-half of the vehicle body need be converted into a couch, the other half providing seats for the physician or attendant and for the driver of the vehicle.

The invention will be best understood from a consideration of the following detailed description, taken in connection with the accompanying drawings forming a part of this specification, with the further understanding that while the drawings show a practical embodiment of the invention, the latter is not confined to any strict conformity with the showing of the drawings, but may be changed and modified so long as such changes and modifications mark no material departure from the salient features of the invention.

In the drawings: Figure 1 is a vertical longitudinal section through the driver's side of a vehicle body showing the invention applied, but with parts not essential to the understanding of the invention omitted, and the seats arranged for the ordinary seating of the occupants. Fig. 2 is a view similar to Fig. 1 but showing the seat backs let down and arranged as a couch or bed. Fig. 3 is a detail section showing the manner of folding up the auxiliary seat against the side of the vehicle body. Fig. 4 is a plan view of the vehicle showing the arrangement of the seats when but one side of the body is converted into the couch form. Fig. 5 is a view similar to that of Fig. 4 showing the arrangement when both sides of the vehicle body are arranged in couch or bed form. Fig. 6 is a rear elevation of one of the seats showing the hinge arrangement. Fig. 7 is a fragmentary elevation of a portion of one of the hinges with some parts shown in section to disclose the internal construction of the hinge. Fig. 8 is a section through a portion of one of the seats showing the hinge and also one manner of supporting the back cushion. Fig. 9 is a section showing one of the supports for the auxiliary seats.

Referring to the drawings, there is shown an automobile 1 provided with a touring body 2 and the showing may be taken as typical of any suitable vehicle provided with a front seat 3 and a rear seat 4, while in the particular showing of the drawings auxiliary or supplemental seats 5 are indicated, but these last-named seats are provided only in larger vehicles designed to carry six or seven or more passengers.

The front seats 3 are provided with backs 6 and the auxiliary seats 5 are provided with backs 7. Each back portion 6 and 7 has a main supporting board or frame 8 and an auxiliary board or supporting frame 9, the latter carrying guide members 10 adapted to an elongated guide member 11 permitting the back portion 9 to slide along the back portion 11 for a purpose which will hereinafter appear. Each seat has a supporting member 12 which may be in the form of a board or frame and the boards 9 and 12 carry cushions 13 and 14, respectively, these cushions following in their construction the usual practice in building vehicle bodies and especially automobile bodies.

The boards 8 are attached to the boards 12 by hinges 15, one leaf of each hinge being made fast in any suitable manner, as by screws 16, to the board 8, and the other leaf of the hinge being made fast by other screws 16 to the board 12. One leaf of the hinge, say that fast to the board 12, is formed with a pintle-receiving portion 17 having an enlargement 18 about midway of the width of the leaf, and the other leaf of the spring is provided with pintle receiving portions matching those of the first-named part of the leaf, and a pintle or pivot pin 19 is provided for connecting the two leaves of the hinge together. Formed on the leaf of the hinge fast to the back board 8 is a sleeve 20 housing a spring 21, and through this sleeve and the spring therein there is extended a pin 22 having a head 23 at one end, and at the other an extension 24 adapted to an opening 25 through the boss 18. A flange 26 on the pin 22 serves as an abutment for one end of the spring 21, and a stop pin 27 projecting from the pin 22 and extending through a slot 28 in the sleeve 20 serves as a limiting means for preventing excessive movements of the pin 22, which latter is designed to operate as a lock pin, and when its extension 24 is seated in the passage 25 the hinge is locked against turning on its pintle and in such position serves to support the back board 8 with the cushion 13 in proper relation to the cushion 14 for supporting a person sitting upright. Stop members 29, 30 on the respective hinge leaves limit the movement of the hinge in one direction, so that when the stop members 29 and 30 come together, the cushions 13 and 14 are at the same level or generally horizontal. When the back is upright, the spring-urged lock pin 22 will move into the passage 25 and thereby hold the seat against displacement. By withdrawing the pin 22 against the normal action of its spring the seat back may be unlocked and dropped to the lowered position. To constitute a firm support for the seat back two hinges are provided near the sides of the seat back, and before the seat back may be lowered both lock pins must be withdrawn.

There need be no difference in the structures of the front seats and the auxiliary seats so far as the backs and their connections to the bottom portions of the seats are concerned, and so the description of the back and hinge construction best shown in Figs. 7 and 8 applies to all the backs of all the seats where these backs are movable from the upright to the lowered or substantially horizontal positions or at angles between such positions. In the absence of the auxiliary seats the backs of the front seat 3 are sufficiently long to reach when in the lowered position to the front edge of the rear seat. When, however, the invention is applied to a large touring car body where auxiliary seats are supplied, then the backs of the front seat need be made only sufficiently high for sitting purposes and the auxiliary seats are employed to bridge the remaining distance to the front edge of the back seat. Since the backs of the front and auxiliary seats are constructed to move from the upright to the lowered position, and the hinges are placed at the outer angle of junction, those edges of the backs of the seats toward the cushions of the bottoms of the seats would become spaced away from the bottoms of the seats, wherefore the slide connections 10 and 11 are provided, thus permitting the movement of the cushions 13 snugly against the corresponding portions of the cushions 14, and leaving no gap when the backs are lowered, so that there is in effect a continuous cushion from the front edge of the front seat to the rear edge of the rear seat. When, however, the backs are lifted to the upright position, the cushions 13 are moved along the guides 11 to permit the then lower ends of the cushions to rest upon the tops of the rear portions of the cushions 14. To vary the angle of the backs supported by the hinges 15 the pins 22 and boss 18 may be so related and constructed that the back of the seat may have limited adjustments about the pintle 19 less than full adjustment provided.

It is customary to support the auxiliary seats 5 in a manner to permit them when folded to be moved against the sides of the vehicle out of the way. For this purpose there is made fast to the floor of the body of the vehicle near each side between the front and back seats a socket member 31 shown best in Fig. 9 and supported at the lower end in this socket member is an angle post 32 having an upright portion 33 offset from the portion entering the socket 31. Fast to the bottom board 12 of the corresponding auxiliary seat 5 is another socket member 34, while the upright 33 has an extension 35 having a hinge connection 36 therewith. The socket 34 with the seat 12 may be moved lengthwise of the hinged extension 35 and the socket 34 is formed at one side with a slot 37 permitting a turning of the extension 35 and seat 5 upon the hinge 36, so that the bottom of the seat may assume an upright position, and then by swinging the post 32 in the socket 31 upon an upright axis the folded seat having the back 7 in line with it, may be moved close to the side of the vehicle, in which position the post 32 may drop into one of several notches 38 provided in the upper end of the socket 31, thus holding the seat in the out of the way position. By turning the post 32 away from the position just described and by moving the seat 5 with its back 7 to the horizontal position, the seat portion and extended back may be brought against the front edge of the rear seat 4 with the back 7 toward the center of the body and the front edge of the seat 5 toward the side of the body, and the width of the seat 5 and back 7 are so proportioned that they will bridge the space between the rear edge of the let down back of the front seat and the front edge of the seat portion of the rear seat 4. When the auxiliary seat 5 with its back 7 in the ordinary upright position is desired for ordinary seating purposes, the post 32 will then engage in a notch 38 holding the seat in the proper position for use. It will be understood that the cushion of the back 7 slides on that portion of the back supported by the hinges 15 in the manner described with reference to Fig. 8, which figure may apply to either the front seat 3 or auxiliary seat 5.

When the seats are adjusted for ordinary travel, the arrangement is similar to that of any touring car body, but should it become desirable to provide a couch-like support, the back of one of the seats 5 is moved to the lowered position and the seat is swung crosswise of the vehicle body until one edge of the seat portion and back portion thereof are against the front edge of the rear seat 4, and then the corresponding back portion 6 of the front seat 3 is lowered until its upper edge is brought against the then front side of the seat 5 already adjusted. This produces a single couch suitable for the support of an injured or sick person, leaving ample room for an attendant, or an attendant and physician if the vehicle is of the type having auxiliary seats, for the other auxiliary seat may then be arranged to support a person sitting upright, and, furthermore, that portion of the front seat usually occupied by the driver of the vehicle may have the back portion upright. This arrangement is shown in Fig. 4.

Should it happen that the occupants of the vehicle are overtaken by night at some place where accommodations for the night can not be had, then both auxiliary seats 5 and both backs 6 are utilized to form a couch or bed as wide as the vehicle, thereby making an over night stay on the road far more comfortable than would be the case were it necessary to sit upright in the seats because of the lack of room to lie down.

Since the bodies of four or five passenger automobiles are usually shorter than seven passenger automobiles, it is advisable to provide for the extension of the front seat in order that the couch structure when the back of the front seat is let down, be long enough to support a grown person at full length in the prone position. This is readily accomplished by providing a slide under the front seat which may be drawn out forwardly, or any other suitable arrangement whereby the support may be prolonged in a forward direction. With seven passenger cars the distance from the upright back of the rear seat to the forward edge of the front seat is sufficient to accommodate a full grown person in the prone position without the necessity of any prolongation of the front seat for the purpose.

What is claimed is:—

1. A vehicle body provided with a relatively fixed rear seat, and a front seat comprising a seat part composed of a supporting member and a cushion, and a back part composed of a supporting member and a cushion, the back cushion supporting member of the front seat being hinged to the seat cushion supporting member and the back cushion being slidably connected to the support therefor, whereby the back of the front seat may be moved from an upright position to a position substantially on a level with the seat portions of both the front and rear seats and the cushion part of the back of the front seat may be moved independently of its support toward and from the seat cushion of the front seat.

2. A vehicle body provided with a rear seat in relatively fixed relation to said body, and a front seat comprising a cushioned seat portion and a cushioned back portion hinged together for movement of the back portion from an upright to a rearwardly extended horizontal position on a level with the seat portion of the rear seat, and the cushioned part of the back of the front seat also having a sliding connection with said back portion for movement toward and from the cushioned seat portion of the front seat in addition to and independent of the movements of said back portion of the front seat from the upright to the rearwardly extended horizontal position.

3. A vehicle body provided with front and rear seats both having seat cushions with the back of the front seat formed of a plurality of individually cushioned sections independent of the seat cushions of said seat, each back section of the front seat being hinged to the seat portion thereof for movement from an upright position to a position substantially on a level with the seat portions of both the front and rear seats, and said back sections of the front seat having the cushions provided with slidable connections with said back sections for bodily movement toward and from the seat cushions of the front seat.

4. A vehicle body provided with front and rear seats with the rear seat relatively fixed and each seat having a cushioned seat portion and a cushioned back portion, the back of the front seat and the cushion carried thereby being divided into independent sections with each back section of the front seat hinged to the seat portion and movable on its hinge to a lowered position to bring the cushion of said back section on a level with the corresponding cushions of the seat portions of both the front and rear seats, said seat cushions maintaining their positions, and the cushions of the hinged back sections of the front seats having sliding connections with said back sections for movement of the cushions toward and from the seat portions of said front seats to change the relations of said cushions to the front seat cushions in accordance with the raised or lowered positions of the backs of the front seats.

5. A vehicle body provided with front and rear seats extending crosswise of the body with auxiliary seats intermediate of the front and rear seats, both the front and auxiliary seats having the back portions movable from an upright to a lowered position substantially on a level with the seat portions of the front and rear seats, the auxiliary seats being also movable to bring the seat and back portions thereof, when the latter are lowered, transversely of the vehicle and in bridging relation to the space between the lowered back of the front seat and the front edge of the seat portion of the rear seat.

6. A vehicle body provided with front and rear seats extending crosswise of the body with auxiliary seats intermediate of the front and rear seats, both the front and auxiliary seats having the back portions movable from an upright to a lowered position substantially on a level with the seat portions of the front and rear seats, the auxiliary seats being also movable to bring the seat and back portions thereof, when the latter are lowered, transversely of the vehicle and in bridging relation to the space between the lowered back of the front seat and the front edge of the seat portion of the rear seat, the auxiliary seats being adjustable independently one of the other and the back portion of the front seat being divided into independently operable sections.

7. A vehicle body provided with front and rear seats extending transversely thereof with auxiliary seats intermediate of the front and back seats, said auxiliary seats having supports constructed to permit the turning of the seats crosswise of the vehicle, each auxiliary seat having a back portion movable from an upright to a lowered position substantially on a level with the seat part of the auxiliary seats, and the front seat having its back formed in a number of sections corresponding to the number of auxiliary seats and each section movable independently from an upright to a lowered position substantially on a level with the seat portions of the auxiliary seats and the rear seat.

8. A vehicle body provided with front and rear seats extending transversely thereof with auxiliary seats intermediate the front and back seats, said auxiliary seats having supports constructed to permit the turning of the seats crosswise of the vehicle, each auxiliary seat having a back portion movable from an upright to a lowered position substantially on a level with the seat part of the auxiliary seats, and the front seat having its back formed in a number of sections corresponding to the number of auxiliary seats and each section movable independently from an upright to a lowered position substantially on a level with the seat portions of the auxiliary seats and the rear seat, the back sections of the front seat and the backs of the auxiliary seats having cushioned portions in telescoping relation to parts of the backs carrying them.

9. A vehicle body provided with front and rear seats and with auxiliary seats intermediate thereof, the front seat having a back portion made up of sections independent of the seat portions and movable from an upright to a lowered position, and each auxiliary seat having a back portion operable in like manner to the sections of the back of the front seat to bring the seats and the backs of both the front and auxiliary seats all on substantially a level with each other on either or both sides of the longitudinal center line of the vehicle, the width of each auxiliary seat being substantially that of the distance between the lowered back of the front seat and the front edge of the rear seat, whereby the auxiliary seats when extending transversely of the length of the vehicle body bridge the space between the lowered backs of the front seat and the front edge of the rear seat.

10. A vehicle body provided with front and rear seats and with auxiliary seats intermediate thereof, the front seat having a back portion made up of independently operable sections movable from an upright to a lowered position and each auxiliary seat having a back portion operable in like manner to the sections of the back of the front seat to bring the seats and their backs all on a substantial level on either or both sides of the longitudinal center line of the vehicle, the auxiliary seats having supports upon which they may be turned to bring the seat portions and lowered backs into transverse relation to the length of the vehicle and in bridging relation to the spaces between the lower back sections of the front seat and the forward edge of the seat portion of the rear seat.

11. In a vehicle, a seat having a back portion hinged to the seat portion thereof and provided with means for holding the back of the seat in either the elevated or lowered positions, said seat having a seat cushion and a back cushion with slidable connections between the back portion of the seat and the cushion thereon, whereby the back cushion may be moved along the back portion of the seat to close the gap between the back cushion and the seat cushion when the back is in the lowered position and to permit the back cushion to rest upon the rear portion of the seat cushion when the back is in the elevated position.

12. In a vehicle provided with front and rear seats, an auxiliary seat having a back portion hinged to the seat portion thereof and movable from an upright to a lowered position in line with the seat portion of the auxiliary seat, and a post for the seat provided with an offset swivel support and with a hinge connection to the seat for the adjustment of the seat into different relations with the rear seat of the vehicle.

In testimony whereof I have affixed my signature in presence of two witnesses.

WILLIAM O. CORNWELL, Jr.

Witnesses:
 JERRY W. FORBES,
 FRANK WATTS.